United States Patent [19]

Goupy et al.

[11] 4,252,355
[45] Feb. 24, 1981

[54] BUMPERS OR SHIELDS FOR THE PROTECTION OF AUTOMOBILES

[75] Inventors: Marcel Goupy, Saint-Cloud; Pierre Roubinet, Rueil-Malmaison, both of France

[73] Assignee: Regie Nationale des Usines Renault, Boulogne-Billancourt, France

[21] Appl. No.: 38,940

[22] Filed: May 14, 1979

[30] Foreign Application Priority Data

May 16, 1978 [FR] France .................. 78 14370

[51] Int. Cl.³ .............................................. B60R 19/10
[52] U.S. Cl. .................................. 293/120; 293/132
[58] Field of Search ............... 293/120, 121, 122 130, 293/132, 133, 135, 136, 154, 155

[56] References Cited

U.S. PATENT DOCUMENTS 3,843,182 10/1974 Walls et al. ..................... 293/122
3,999,793 12/1976 Roubinet ......................... 293/120
4,029,350 6/1977 Goupy et al. ................... 293/122

FOREIGN PATENT DOCUMENTS 2221930 10/1974 France .
2256656 7/1975 France .
2266595 10/1975 France .

Primary Examiner—Robert R. Song
Attorney, Agent, or Firm—Oblon, Fisher, Spivak, McClelland & Maier

[57] ABSTRACT

A composite bumper structure is made up of an elongated molded bumper section, molded attachment lugs and energy absorbers. The bumper section is integrally molded with the lugs and both contain elongated reinforcement fibers. The energy of a collision is absorbed both by the deformation of the energy absorbers and the elastic deformation of the lugs. The bumper section may also support a stylistic facade.

4 Claims, 10 Drawing Figures

BUMPERS OR SHIELDS FOR THE PROTECTION OF AUTOMOBILES

BACKGROUND OF THE INVENTION

1. Field of the Invention

The present invention relates to thermoplastic or thermohardened automobile bumpers or shields.

2. Description of the Prior Art

Bumpers or shields for the protection of automobiles, made of thermoplastic or thermohardening materials, whether or not associated with metal reinforcements, are already known.

These protective devices are customarily attached to the body by means of fittings which are able to assure the absorption of a certain amount of the energy upon impact, but which have the drawback of showing major permanent deformations. These deformations lead to an irreversible displacement of the protective devices, which highlights the damage suffered from the impact.

SUMMARY OF THE INVENTION

The present invention proposes to remedy these drawbacks by producing molded protective devices formed in such a way that some of their parts constitute elastic elements for coupling to the body.

BRIEF DESCRIPTION OF THE DRAWINGS

Various other objects, features and attendant advantages of the present invention will be more fully appreciated as the same becomes better understood by the following detailed description when considered in connection with the accompanying drawings wherein like reference characters designate like or corresponding parts throughout the several views, and wherein.

DETAILED DESCRIPTION OF THE PREFERRED EMBODIMENTS

Figure 1:
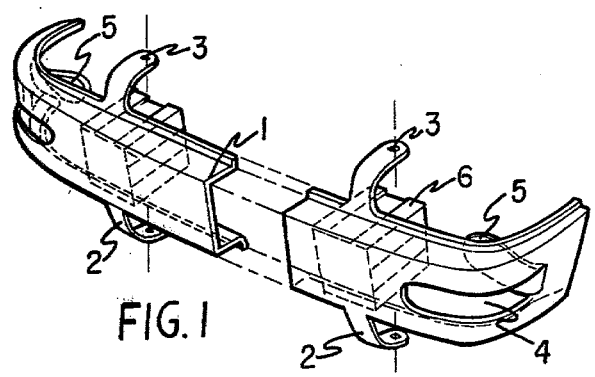
FIG. 1 is an isometric projection, with a partial section, of a bumper according to the invention.
Figure 2:
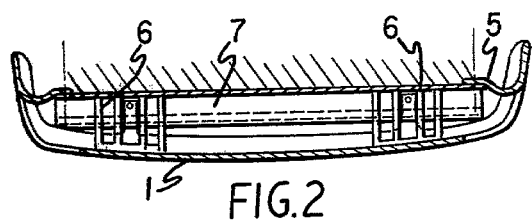
FIG. 2 is a plan view of a section of said bumper.

As seen in FIGS. 1 and 2, the bumper of the present invention consists of the bumper section 1, its center fastening lugs 2 and 3, openings 4, lateral fastening lugs 5, and absorbers 6 resting against a cross member 7 of the structure of the automobile, the absorbers essentially formed of hollow elements partitioned parallel to the longitudinal axis of the bumper.

Various particularities of such an arrangement have already been claimed by the applicant, especially in French patent applications 73/08881 of Mar. 13, 1973, 73/46906 of Dec. 28, 1973, and 74/07434 of Mar. 5, 1974. Hence, only those particular provisions concerning the elastic elements for coupling to the body are examined in detail.

According to the provisions of the invention, taken in isolation or in combination, these elastic elements, consist of lugs 3 or 5 molded at the same time as the bumper section and placed either in the extension of a lower flange on the bumper, as 2, or an upper one, as 3, or towards the sides, as 5.

These lugs are attached to the body by their free ends, and when they are subjected to strain transmitted by the front part of the bumper or shield, they are able to give way, absorbing the energy, which they subsequently restore when the bumper returns to its original position.

A particularity of the invention lies in the way these lugs are obtained through molding.

Elements such as 2 and 3 pose no problems with regard to their being withdrawn from the mold, but in order to improve their mechanical characteristics, when the section 1 is molded from resin-based composite materials reinforced with fibers, it is planned to have supplementary molding loads so that a relatively high percentage of this reinforcement will consist of continuous or long fibers going in the direction of the length of these lugs.

Elements such as 5 constitute undercut pieces, and it is possible to achieve them by the creation of openings such as 4, whose dimensions, projected onto a plane perpendicular to the direction of the molding, are greater than or equal to those of the leg 5 projected under the same conditions, which permits unmolding.

In this case, it is likewise planned to load the mold with fibrous elements, locally inserted, arranging them in such a way that a major proportion of these fibers are going in the direction of the length of the lug in question.

The molding loads used for this purpose may in particular be prepermeated with polyester resins reinforced by glass fiber, including a major proportion of reinforcements consisting of continuous threads incorporated during manufacture, according to application no. 74/12176 of Apr. 5, 1974, filed by the applicant.

According to an associated provision of the present application, it is planned that the openings such as 4 necessary for molding the lateral lugs can be advantageously utilized for placement of electrical parts (such as blinker lights or light rims, or padding of synthetic material to distribute stress during collisions).

Figure 3A:
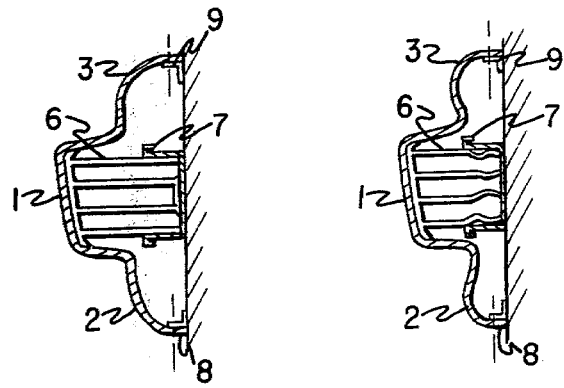
FIG. 3a is a lateral view of said bumper in section at right angles to the fastening lugs.
Figures 4A, 4B:
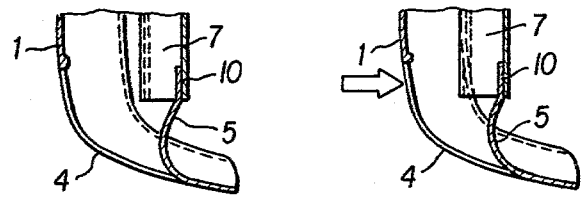
FIG. 4a is a plan view of the end of a longitudinal section at the level of a lateral fastening lug.
FIG. 4b is the same view as FIG. 4a after elastic deformation due to application of pressure.

FIGS. 3a and 4a clarify the relative arrangement of the various elements described above. In particular can be seen how the bumper section 1 rests against the absorber 6, which in turn rests against the cross member 7 attached to the chassis of the vehicle.

The lower 3 and upper lugs 2 are attached to the body at 8 and 9. The lateral lug 5 is attached at 10 on the cross member 7.

Figure 3B:
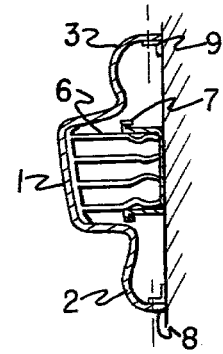
FIG. 3b is an identical view with FIG. 3a after elastic deformation due to application of pressure.

FIGS. 3b and 4b show the elastic deformations arising from impact on the elastic lugs 2, 3, and 5, and on the absorbers 6, following displacement of the bumper section 1 which is not very ductile. The impact energy is absorbed essentially by the elastic deformation of the absorbers 6, and the section 1 subsequently returns to place through the elastic return of the absorbers and the fastening lugs.

Figure 5:
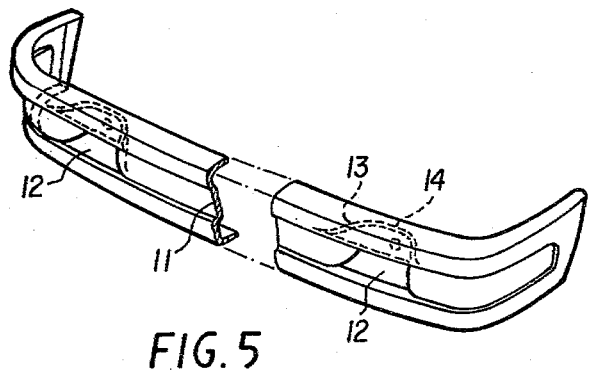
FIG. 5 is an isometric projection of a bumber according to the invention with a variation in the method of obtaining elastic fastening lugs.
Figure 6:
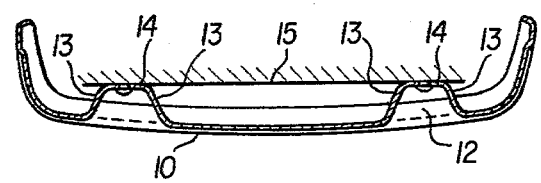
FIG. 6 is a plan view of a longitudinal section of the part shown in FIG. 5.

FIGS. 5 and 6 show a variant of the preferred embodiment in which flexible attachment is assured by the bottom of two pressings set in the center of the bumper section.

In particular the section 11 and the pressings 12 make it possible to obtain from molding the elastic lugs 13 with their attachment surface 14 at a cross member 15 integral with the body, as seen in FIGS. 5 and 6.

As was previously indicated, the pressings 12 can be arranged to receive electric signaling parts or light rims, protective padding, etc.

Figure 7:
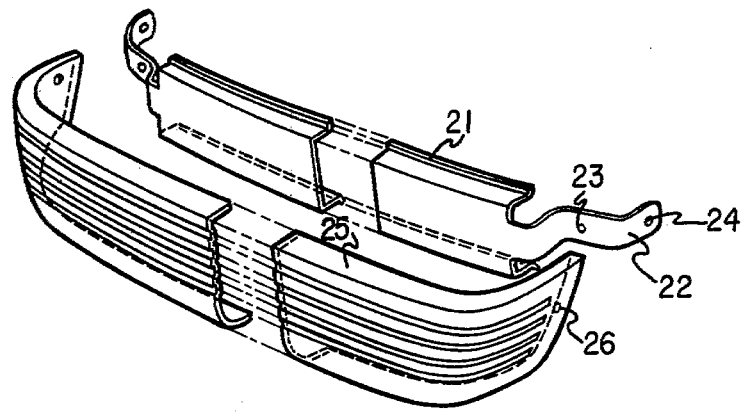
FIG. 7 is an isometric projection of a composite bumper according to the invention including a frame with elastic lugs and a covering element.
Figure 8:
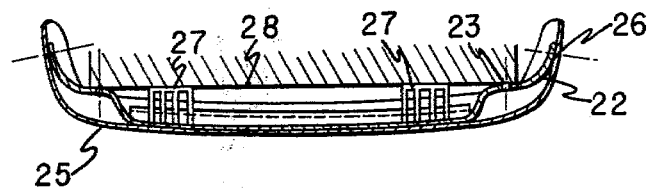
FIG. 8 is a plan view of the part shown in FIG. 7.

Another variant of the arrangements claimed according to the invention is shown in FIGS. 7 and 8.

FIG. 7 shows a composite bumper consisting of a section 21 including elastic lugs 22 at its ends with attachment holes 23 and 24, and a facade forming a covering 25 permitting stylistic effects, the facade including attachment holes such as 26. These same elements are found on the view in FIG. 8, where, in addition, one can see the absorbers 27 and the cross member 28 forming an integral part of the body.

According to the preferred method of the invention and by way of example, section 21 can be molded in polyester reinforced with glass fibers in such a way that a major percentage of the fibers are aligned in the longitudinal direction, in particular to form the lateral lugs 22. This part is associated with the facade 25 molded in thermoplastic material such as, for example, ethylene-propylene copolymers, optionally modified with elastomers.

The section 21 serving as an elastic reinforcement intended to absorb stress can be attached to the body by bolting onto the cross member 28 with the aid of holes such as 23 and can support and fix the facade 25, for example by bolting with the aid of holes such as 26 facing hole 24 of the elastic lug 22.

The ability of the part 21 to take on elastic deformation and return to the original form makes it possible to make it an integral part of the covering 25 at various points by conventional techniques: rivets, clips or elastic jointing, for example, without suffering the drawbacks found in the known arrangements associating a flexible facade with metal sections-reinforcements.

Furthermore, it would not be beyond the scope of the present invention to consider any application involving parts for protection against impact, such as lateral protection for automobiles, for example, in which the protection can be assured by a molded part, encased or not, and conceived such that the elastic attachment elements are integrated into the part and obtained directly from molding with it.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A composite bumper structure for an automobile, said structure comprising:
   a bumper section composed of molded synthetic material, said bumper section including a plurality of molded attachment means integrally molded with said bumper section for connecting said bumper section to said automobile, said attachment means being elastically deformable, wherein each of said molded attachment means is in the form of an elongated lug and contains high density of elongated reinforcement fibers, the orientation of the major portion of which is parallel to the direction of elongation of said lug; and
   a plurality of energy absorbers also attaching said bumper section to said automobile;
   wherein at least a portion of a force acting on said bumper section will be absorbed by elastically deforming said molded attachment means.

2. The composite bumper structure of claim 1, wherein said molded attachment means are in the form of lugs which are pressed from adjacent the longitudinal center line of said bumper structure.

3. The composite bumper structure of claim 1, wherein said bumper section supports a stylistic facade composed of thermoplastic material.

4. The composite bumper section of claim 1, wherein said bumper section is positioned on a portion of said vehicle which is transverse to the length of said vehicle.

* * * * *